No. 879,020.
PATENTED FEB. 11, 1908.
P. SWEENEY.
PLOW.
APPLICATION FILED OCT. 1, 1907.
2 SHEETS—SHEET 1.
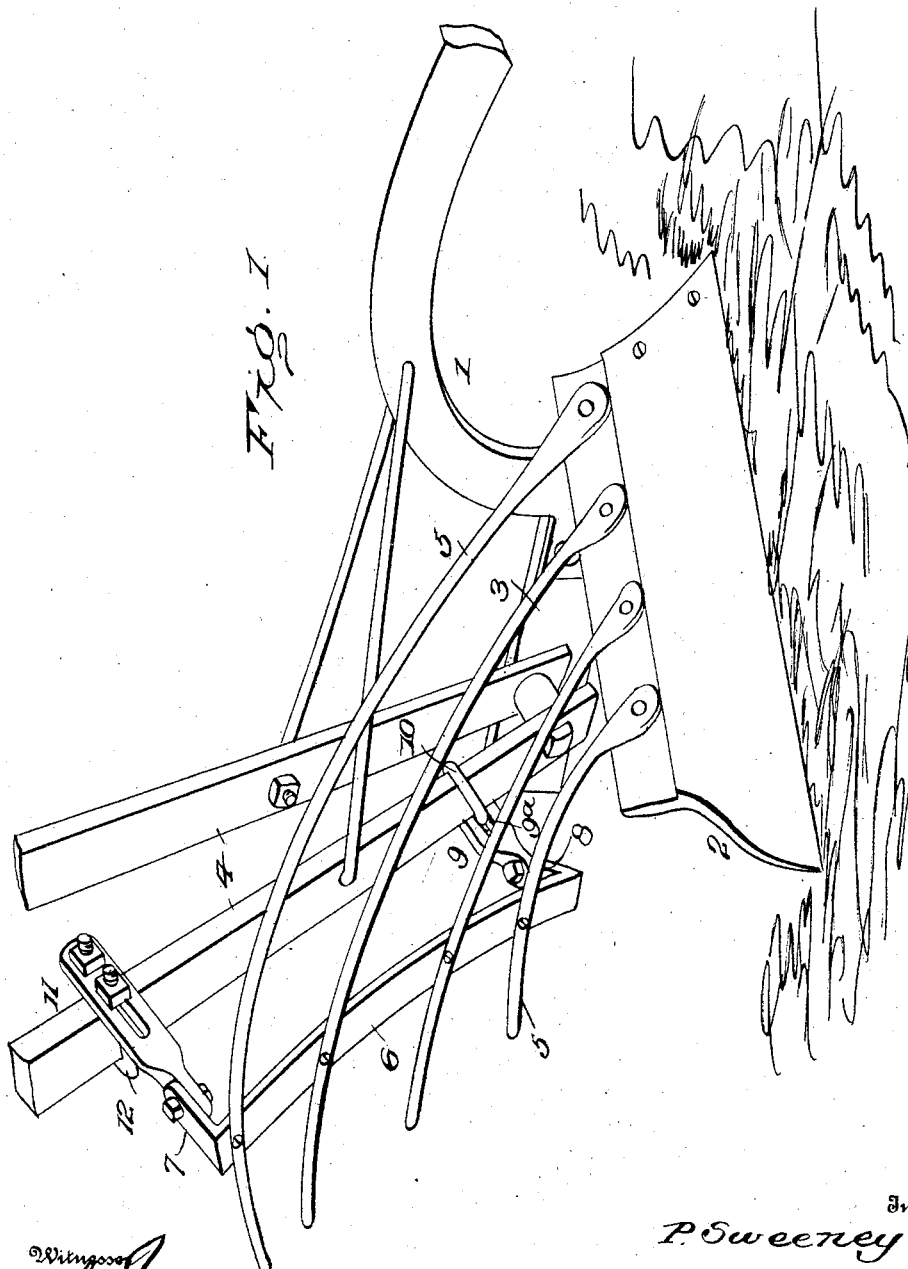
Inventor
P. Sweeney No. 879,020.
PATENTED FEB. 11, 1908.
P. SWEENEY.
PLOW.
APPLICATION FILED OCT. 1, 1907.
2 SHEETS—SHEET 2.
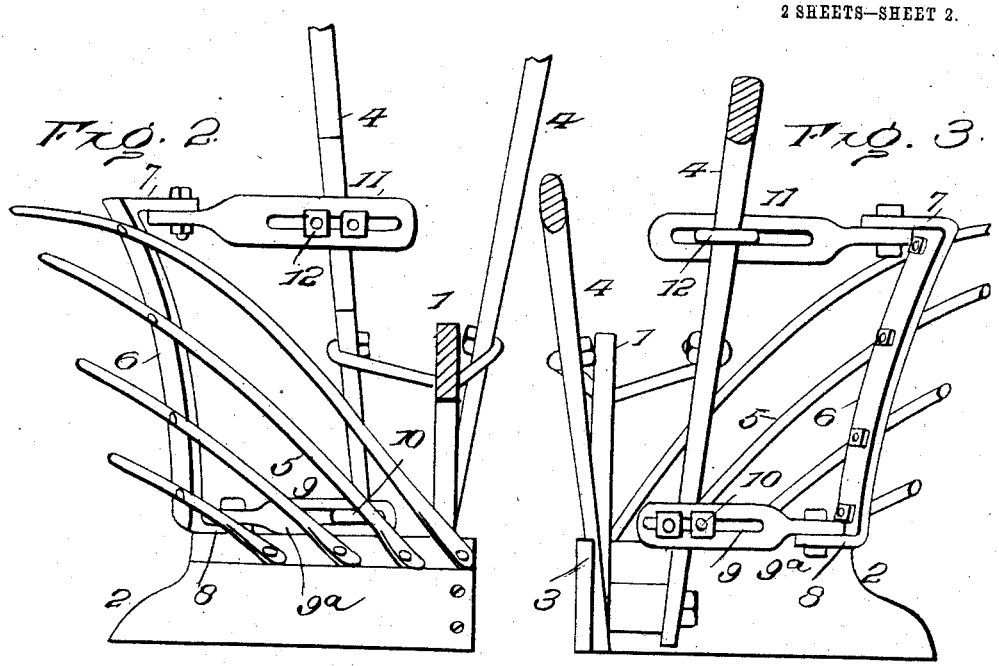
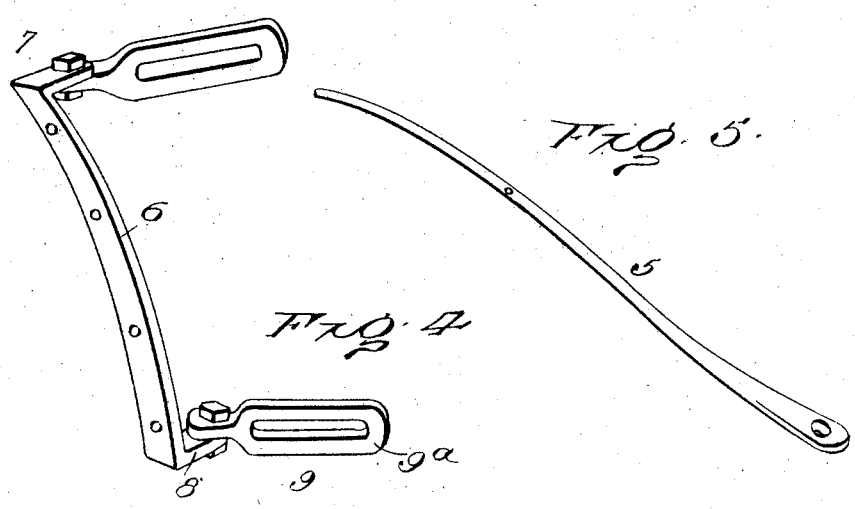
Witnesses
Inventor
P. Sweeney
By
Attorneys

UNITED STATES PATENT OFFICE.

PATRICK SWEENEY, OF ERICSON, NEBRASKA.

PLOW.

No. 879,020.  Specification of Letters Patent.  Patented Feb. 11, 1908.

Application filed October 1, 1907. Serial No. 395,415.

*To all whom it may concern:*

Be it known that I, PATRICK SWEENEY, citizen of the United States, residing at Ericson, in the county of Wheeler and State of Nebraska, have invented certain new and useful Improvements in Plows, of which the following is a specification.

This invention relates to plows of the variety embodying an open mold board composed of rods or bars which are spaced apart to provide clearance openings for the escape of soil when turning sod, turf or like ground.

The purpose of the invention is to provide a plow of the character aforesaid having an adjustable mold board which may be regulated at will and in which the several elements, rods or bars, may be simultaneously moved since they are connected at their rear ends to a movable brace, which is adjustable vertically, laterally and angularly to adapt the mold board to the soil so as to secure the best results.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a plow embodying the invention. Fig. 2 is a front view of the plow. Fig. 3 is a rear view of the plow. Fig. 4 is a detail perspective view of the brace and connecting means for attaching the same to a handle. Fig. 5 is a perspective view of a rod or bar forming a mold board element.

Corresponding and like parts are referred to in the following description and indicated in all the views of the drawings by the same reference characters.

The plow comprises beam 1, share 2, land side 3 and handles 4. These parts may be of any construction, pattern and arrangement according to the design and make of the implement.

The mold board consists of a series of elements 5, the same consisting of rods or bars curved throughout their length according to their relative position in the completed mold board, said rods or bars varying in length and curvature so as unitedly to provide a mold board of general outline to effect the turning of the slice lifted by the share when the plow is in operation. The front ends of the mold board elements 5 are flattened and pierced to receive bolts or fastenings by means of which they are attached to the upper edge portion of the share 2 so as to come flush upon their outer sides with the share. As shown, the upper portion of the share 2 is rabbeted or depressed a distance to receive the front ends of the rods or bars 5 to admit of their upper sides coming flush with the share so as not to obstruct the sliding of the turf or soil upon the mold board when turning the same. The upper rear ends of the mold board elements 5 are attached to a brace 6 which in turn is connected to one of the handle bars. By having the elements 5 connected to the brace 6, movement of the latter effects simultaneous adjustment of the elements 5 and also insures an approximate equalization of the strain and wear upon the coöperating parts.

The brace 6 is curved in its length and its end portions are bent in the same direction to form lugs 7 and 8 to which the coupling means are pivotally connected and which coupling means unite opposite end portions of the brace to the handle bar. The fastenings for connecting the mold board elements 5 to the brace 6 have their outer ends countersunk in the parts 5 so as to come flush therewith and thereby prevent projecting parts which would tend to obstruct free movement of the slice in the turning thereof in the operation of the plow. The lower coupling means 9 consists of a longitudinal slotted plate or bar 9 whose outer end is pivoted to the lower lug 8. A clip 10 connects the coupling 9 to the handle bar and embraces the latter at its front and upon opposite sides. The upper coupling 11 consists of a longitudinally slotted plate or bar similar in construction to the coupling 9 and its outer end is pivoted to the upper lug 7. A clip 12 connects the coupling 11 to the adjacent handle bar. The coupling 11 is placed against the front side of the handle bar, whereas the coupling 9 is placed against the rear side of said handle bar. The upper coupling 11 is somewhat longer than the lower coupling to provide for lateral adjustment, so as to throw the upper portion of the mold board outward to a greater or less extent according to the nature of the soil to be plowed. A wear plate 13 is interposed between the coupling 11 and the handle bar to which said coupling is secured and is of a length to admit of vertical adjustment of the coupling 11.

It is to be understood that the mold board may comprise any number of rods or bars 5 and that the same may be spaced apart any distance according to the desired result. By having the rear ends of the mold board elements connected to one part, as the brace 6, movement of the latter effects simultaneous adjustment of the elements 5 to produce the desired effect and result.

Having thus described the invention, what is claimed as new is:

1. In a plow, the combination of a mold board comprising a series of elements, an upwardly arranged brace having the rear end portions of said elements connected thereto and provided at its ends with upper and lower inner lugs, upper and lower couplings having pivotal connection with the respective lugs, and means for adjustably securing said couplings to the plow frame.

2. In a plow, the combination of a mold board comprising a series of elements, a brace having the rear end portions of said elements connected thereto, coupling means at opposite ends of said brace, the one arranged in front of a handle bar and the other in the rear of said handle bar, and means for securing said couplings to the handle bar.

3. In a plow, the combination of a mold board consisting of a series of elements, a curved brace having the rear end portions of said elements connected thereto and having its end portions bent to provide lugs, slotted couplings pivoted at one end to the respective lugs, and means for adjustably connecting said couplings to a handle bar of the plow.

4. In combination, in a plow, a share having its upper portion rabbeted or depressed, rods or bars having their front ends attached to the depressed portion of the share so as to come flush at their front sides therewith, a curved brace having the rear end portions of said rods connected thereto and having lugs at its ends, longitudinally slotted couplings pivoted to said lugs, and means for adjustably connecting said couplings to a handle bar of the plow.

In testimony whereof I affix my signature in presence of two witnesses.

PATRICK SWEENEY. [L. S.]

Witnesses:
    JAMES A. CLARK,
    C. S. HALL.